3,711,294
NATURAL ORANGE BASE

Cedric D. Atkins and John A. Attaway, Winter Haven, and Matthew D. Maraulja, Lakeland, Fla., assignors to State of Florida, Department of Citrus
No Drawing. Filed Oct. 20, 1969, Ser. No. 867,886
Int. Cl. A23l 1/02
U.S. Cl. 99—79      11 Claims

ABSTRACT OF THE DISCLOSURE

Single strength orange juice is heated to deactivate the natural pectic enzymes. Specific pectic enzymes are added to the juice and hydrolysis of the pectins is continued until the level of water soluble pectins is between 0.01 to 0.15 weight percent. The specific enzymes are deactivated by heating and the insoluble solids are removed. The single strength base can be converted into a concentrate by removing water to produce a product having a Brix value of about 64–80°. A carbonated beverage is produced by diluting the orange juice base concentrate with carbonated water. Isotonic salts can be added to the orange base.

---

This invention relates to a highly colored, smooth, low viscosity orange base having the natural color, cloud and body of the fruit juice from which it it obtained and yet being free of suspended solids.

Orange juice contains the natural occurring colloid stabilizer known as pectin which gives the juice a viscosity or consistency termed "body" along with suspended fatty materials and phospholipids which are partly responsible for the cloud present in citrus juices. Previous attempts to remove insoluble pulp solids from citrus juices have resulted in also detrimentally affecting the body and cloud of the citrus juice. For example, in the past, when the pectin colloid has been altered by the activity of the pectic enzyme pectinesterase, the juice has clarified and become watery. U.S. Pat. 2,970,948, to Stevens, discloses such a procedure whereby insoluble solids present in fruit juice are removed by the addition of pectinesterase to obtain a "brilliantly clear serum." However, the serum obtained by the invention of this patent is subsequently dried to give a nutrient media for the cultivation of bacteria and is not a satisfactory juice for consumption due to its lack of cloud and body.

Now in accordance with the present invention, it has been found that a highly colored, smooth, low viscosity orange base, which can be concentrated into a 100% orange juice syrup suitable for production of bottled or canned beverages and meeting all the requirements of a bottle of syrup and, in addition, having satisfactory cloud and body while being free of suspended solids can be obtained from fresh or reconstituted orange juice, by hydrolyzing substantially the pectic substances present in the orange juice specifically without affecting or removing phospholipids present in the orange juice and then separating the insoluble fatty materials from the juice.

Surprisingly, it has been found that by employing certain specific enzymes which are specific for pectic substances, it is possible to effect the hydrolysis of pectic substances in orange juice and thereby permit the removal of fatty solids without also removing phospholipids which are responsible for the desirable optical properties (i.e. cloud) and body in natural orange juice and which are retained in the product of the present invention.

According to the present invention, freshly extracted orange juice or reconstituted bulk orange juice concentrate is first heated to a temperature of about 155° to 210° F., preferably about 165° F., in order to inactivate the naturally present pectic enzymes in the orange juice such as pectine-sterase. Subsequent to this heating, the juice is cooled to a temperature of about 70° to 120° F., preferably about 80° F., and sufficient pectic enzyme added to hydrolyze a substantial portion of the pectins present in the juice. The pectic enzyme employed (which may contain traces of adulterating non-specific enzymes) should, however, not be permitted to remain in contact with the citrus juice substrate for sufficient time to affect the substances responsible for maintaining the cloud, color and body of the juice. The amount of enzyme actually employed will depend on a number of factors such as time of treatment until the enzyme is deactivated, enzyme concentration and temperature. Generally, these parameters can be varied as convenient by one skilled in the art to effect a reduction of the pectic fraction to about 0.01 to 0.15 weight percent pectins and about 0.002 to 0.01 weight percent $H_2O$ insoluble solids. Typically, for example, about 4 to 8 volume percent based on the volume of single-strength juice of enzyme is sufficient when the juice containing the enzyme is allowed to stand for about 18–30 hours at about 70°–120° F. before raising the temperature to decativate the enzyme.

Following addition of the pectic enzyme to the juice, the juice is allowed to stand at a temperature of about 70° to 120° F., preferably about 80° F., in order to destroy substantially all the low pectins present in the juice which lack gelling strength and are the result of maceration of the more solid fruit parts. Generally, it is not necessary to remove substantial amounts of high grade pectins such as protopectin which are present in insoluble solids. The juice is then heated to a temperature of about 155° to 210° F., preferably about 200° F., to inactivate the enzymes present and also destroy any microorganisms. Insoluble solids are then removed, for example, by decanting, and the remaining juice treated by centrifuging or filtering, for example, to yield a colored single-strength juice similar to that present in the cell sac of the fruit prior to normal juice extraction, but absent the insoluble solids and low grade soluble pectins which hold them in suspension. The juice, however, which has a viscosity of less than 100 centipoises at 65° Brix and 77° F., retains the desirable cloud and body naturally present in fresh juice and in addition, has good shelf life due to the removal of oxidizable fatty materials.

If desired, the juice prepared according to the present invention can be concentrated, for example, under vacuum, in order to preclude the use of high temperatures which result in a "burned" taste, to yield a sparkling colored syrup of any desired concentration (e.g. about 64°–80° Brix) for any juice product. If may also be desirable to refilter this base prior to bottling in order to remove traces of insoluble cloud materials that may have developed on storage of the base.

Suitable pectic enzymes for use in the present invention can be prepared from sprouted oats, for example, or obtained commercially, for example, under the trade name "Spark-L." Selection of the most desirable enzyme for removal of excess insoluble solids present in extracted juices depends on the specificity of the chosen enzyme to hydrolyze pectin to insoluble pectates without the removal of juice color and cloud naturally present in citrus juices at the pH of the juice.

Concentrates of the natural pectinesterase enzyme can be prepared, for example, where processing of citrus fruits is in progress. Insoluble solids from juice extraction procedures in the form of pulp, juice sacs, and rag are washed with distilled water to remove sugars and acids present in the mixture. The citrus pulp solids are rapidly screened and pressed to remove excess water. The dewatered residue is then comminuted to pass a 100 Tyler mesh sieve. The slurry is tested to determine the potency of the native pectinesterase extract at the pH of about 7.0 to 7.5. The insoluble solids slurry containing the pectinesterase is added to 80° Brix clarified citrus concentrate at a natural pH of 2.3 to 4.5. This addition should not lower the natural sugar concentration to below 65 percent concentration. The enzyme contained in the 65 percent natural sugar concentrate is then subjected to temperatures below 0° F. Dehydration of the yeast and fungi bodies effectively destroys the ability of these microorganisms to produce additional enzymes destructive to the color and cloud of citrus juices. When this citrus enzyme mixture is used for clarification, the pulp or insoluble solids content of the juice to be clarified should not be in excess of 12 percent insoluble solids content.

The polygalacturonase activity of a pectinol preparation, representing an alcohol precipitate from an extract of mold cultures was compared to the activity of the pectinesterase prepared from citrus residues of pulp, juice sacs and rag. The crude enzyme preparation of pectinesterase, without the presence of NaCl (salt normally used in pectinesterase extraction) retained sufficient activity for successful clarification, and gave more evidence that there are at least two enzymes, pectinesterase and pectinase, capable of demethylating pectin; one occurring in higher plants (citrus) and the other in commercial pectinase preparations made from mold cultures. These commercially prepared enzyme solutions performed, when tested on citrus juices, in a similar manner to the pectinesterase enzyme concentrated from citrus pulp or insoluble solids normally present in extracted unheated citrus juices.

tion can also have incorporated therein effective amounts of isotonic salts, such as sodium and calcium chloride, as are described in co-pending application Ser. No. 815,506, filed Apr. 11, 1969, now abandoned in favor of continuation-in-part application, Ser. No. 24,820, filed Apr. 1, 1970, now U.S. Pat. No. 3,657,424 and divisional application thereof, Ser. No. 113,654, filed Feb. 8, 1971. The presence of these additional salts is to replace those lost from the body during strenuous physical exercise. The amount of such sodium salt added will be about 0.05–0.18 weight percent and about 0.007–0.04 weight percent calcium salt will be added. Potassium salt can also be added in amounts of up to 0.004 weight percent.

EXAMPLE I

Freshly extracted single-strength orange juice was heated to 165° F. and cooled to approximately 80° F. One half pint of a suitable specific pectic enzyme (Spark-L) was added to each 100 gallons of single-strength juice. The juice was allowed to stand for 25 hours. The treated juice was then heated to about 200° F. to completely inactivate the enzymes and destroy any microorganisms present. The excess insoluble solids of the juice were decanted and the remaining juice centrifuged to yield a colored single-strength juice that represented that present in the cell sac of the fruit prior to normal juice extraction.

Following this preparation, the juice was then concentrated under vacuum to yield a sparkling colored syrup of 65° Brix concentration. The analyses of the base and a control concentrate was as follows:

| | Concentration | Viscosity (apparent), cp. | Insoluble solids, percent by volume | Hunter citrus colorimeter |
|---|---|---|---|---|
| New base | 65° Brix (34.8 Bé) | 70 | Trace | 38 |
| Standard (Control) concentrate. | 65° Brix (34.8 Bé) | 3,000 | 9 | 38 |

Pectinesterase and polygalacturonase or mixtures of the two were used to clarify citrus juices. The pectinesterase enzyme catalyzes the cleavage of methoxyl groups from the pectic chain. These groups in the presence of calcium from low methoxyl gel particles that lack solubility in water or citrus juices and are readily removed by centrifugation of the citrus juice substrate. Polygalacturonase rapidly breaks the main pectin chain to form insoluble pectinates that can be centrifuged or filtered from the juice substrate. In preparing the clear citrus juice base where centrifugation is a principal step in the process, the use of polygalacturonase is not necessary unless the centrifugation process lacks thoroughness.

It is an additional advantage of the present invention that the orange base concentrate prepared thereby can be employed to prepare a carbonated single-strength citrus juice. Preparation of such carbonated single-strength citrus juices has not in the past been successful due in part to the tendency of pulp particles in the bottled product to cause release of carbon dioxide upon opening and, more importantly, because these pulp particles have prevented proper carbonation of the product prior to filling and capping. According to the present invention, however, a carbonated bottled citrus juice of exceptionally good quality and having good cool storage stability and a pleasant tangy flavor can be prepared from the single-strength orange base of this invention having a concentration of about 11–15° Brix. Advantageously, about 1–3 weight percent citric acid and trace amounts of cold press peel oil (about 0.01–0.1 volume percent) can be added for flavor. Conventional preservatives such as sodium benzoate can also be added. Subsequent to mixing of the above ingredients, the bottles of single-strength citrus juice are pre-chilled to freezing. Carbonated water can then, for example, be added to the chilled base in desired amounts.

The orange base of the present invention, either as a concentrate or at its original strength, prior to concentra-

EXAMPLE II

Carbonated bottled orange juice was prepared using a deeply colored Valencia orange base having a ratio of 21.6, a Brix of 64.83° and an apparent viscosity of 70 centipoises. The base was first thawed and filtered through rice papers to remove remaining pulp. Citric acid was added (64.4 g. in 242 ml. of solution) to 3 liters or 3954 g. of the base to adjust the ratio to 14.0 and the Brix to 62.5°. Cold-pressed peel oil (2.30 ml.) was then added to obtain an 0.015% level in the reconstituted juice for flavor enhancement. The fold was calculated based on a 14.0° Brix reconstituted juice as follows:

$$\frac{\text{LB./GAL. } 62.5° \text{ BRIX}}{\text{LB./GAL. } 14.0° \text{ BRIX}} = \frac{6.782}{1.231} = 5.51 \text{ FOLD}$$

To obtain 14.0° Brix, one part by volume of the adjusted base must be reconstituted with 4.51 parts of carbonated water. Therefore, to each 6 fluid ounce bottle of juice (178 ml.), 32 ml. of the orange base was added.

A solution of sodium benzoate was prepared containing 8.54 grams per 48 ml. of solution and one ml. was added per bottle to obtain 1/10 of 1% benzoate content.

The bottles were pre-chilled to 0° C. prior to addition of the concentrate base and the sodium benzoate and for one hour afterward in order to solidify the contents to prevent gushing or foaming when filling with carbonated water. The water temperature during carbonation and filling of the bottles was 32° F. After the bottles and contents had reached approximately 40° F., they were inverted repeatedly until reconstitution was complete and then placed in 40° F. storage.

Analysis of bottled product

| | |
|---|---|
| Corrected refract Brix | 14.20° |
| Acid percent | 1.01 |
| Ratio | 14.06 |
| pH | 3.5 |
| Pressure-bottled juice p.s.i. | 12–15 |
| Pressure-bottled water p.s.i. | 20–23 |

Flow diagrams 1 to 3 illustrate further the process steps of the instant invention.
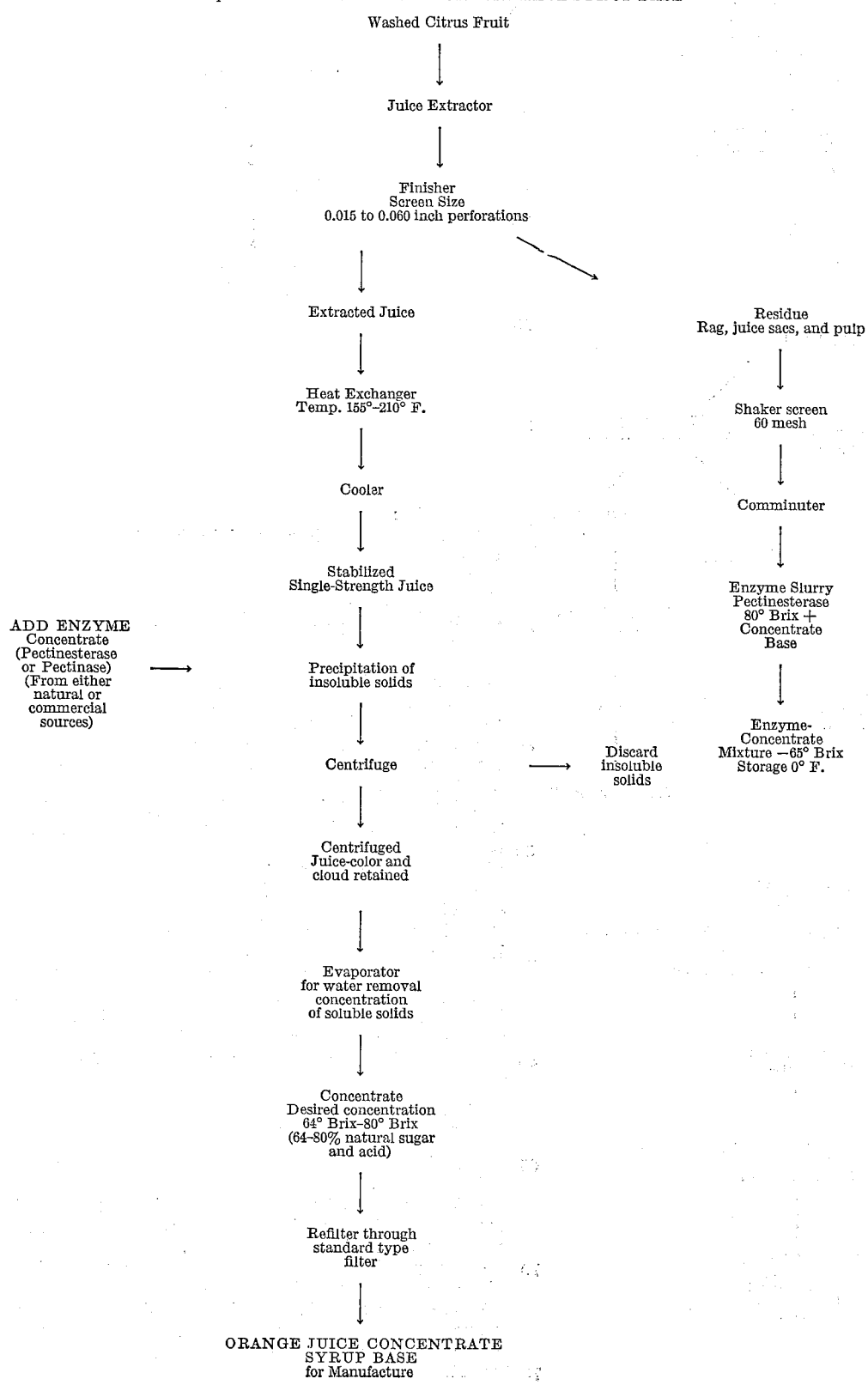

FLOW DIAGRAM No. 2
Preparation of High Energy Concentrate and High Energy Canned Single-Strength Juices from Orange Juice Concentrate Syrup Base Orange Juice Concentrate Syrup Base
65° Brix—80° Brix
↓
Refilter through Rice filter paper or suitable pore filter
↓
Refiltered Syrup Base Selected Brix—72°
↙ ↘
Dilute with Isotonic type salts suspended in water
↓
65° Brix syrup with NaCl, KCl, and CaCl₂ salts
↓
Reconstituted with Distilled or deionized water to 12° Brix
↓
Hot fill into Tin or Glass
↓
Cool
↓
High Energy Supplement Single-Strength Canned Juice (right branch:)
High Energy Supplement Concentrate
↙ ↘
Close Tin or glass Keep Frozen at 0° F.

Heat to 165° F. to 175° F.
↓
Hot Fill in cans or glass
↓
Cool
↓
Store below 45° F

---

FLOW DIAGRAM No. 3
Preparation of Carbonated Orange Juice from Orange Juice Concentrate Syrup Base Orange Juice Concentrate Syrup Base
↓
Filtered Base 65° Brix
↓
Add Cold-Pressed Oil and Essence Oil for 0.012% Level
↓
Measured Amount Sodium Benzoate solution added for 1/10 of 1% Level
↓
Measure amount filled into bottles (shot)
↓
Bottles and Contents Chilled
↓
Bottles filled with chilled carbonated water (Temp. of water 32° F.)
↓
Bottles capped
↓
Carbonated Orange Juice at single-strength Level (10.5° Brix to 13.5° Brix)

---

We claim:

1. A single-strength orange juice base having reduced viscosity and level of insoluble materials while retaining substantially the cloud, color and body of natural single-strength orange juice; said base containing about 0.01 to 0.15 weight percent water-soluble pectins.

2. An orange juice base concentrate prepared from the single-strength base of claim 1 and having a Brix value of about 64°–80° and substantially the cloud, color and body of natural, single-strength juice when reconstituted to a single-strength juice.

3. A carbonated orange juice drink which comprises the orange juice base concentrate of claim 2 and carbonated water.

4. The carbonated orange juice drink of claim 3 to which has been added 1 to 3 weight percent citric acid, 0.01 to 0.1 volume percent orange peel oil, and minor effective amounts of preservative.

5. A process for prepariing a single-strength, highly colored orange base having reduced viscosity and substantially the cloud, color and body of natural orange juice which comprises the steps of: inactivating the pectic enzymes naturally present in single-strength orange juice; effecting hydrolyses of the pectins present in the orange juice until the level of water-soluble pectins is between 0.01 to 0.15 weight percent by the addition of pectic enzymes specific to said pectins present in the juice; deactivating said specific pectic enzymes; and separating and removing insoluble solids.

6. The process of claim 5 wherein the deactivation of both the natural pectic enzymes and the specific pectic enzyme is effected by heating to a temperature of about 155° to 210° F.

7. The process of claim 5 wherein the hydrolysis of pectins in the juice by the specific enzyme is effected at a temperature of about 70° to 120° F.

8. The process of claim 5 wherein a substantial portion of the pectins hydrolyzed are low pectins.

9. The process of claim 5 wherein said specific pectic enzymes are selected from the groups consisting of pectinesterase, pectinase, polygalacturonase and mixtures thereof.

10. The process of claim 5 wherein the single-strength orange base is concentrated to about 64° to 80° Brix.

11. The process of claim 10 wherein the single-strength base is concentrated in a vacuum evaporator.

References Cited

UNITED STATES PATENTS

| | | | |
|---|---|---|---|
| 3,404,990 | 10/1968 | Villadsen | 99—106 X |
| 2,764,486 | 9/1956 | Stevens et al. | 99—78 |
| 3,227,562 | 1/1966 | Houghtaling et al. | 99—205 |
| 2,224,252 | 12/1940 | Callaway | 99—105 X |
| 3,236,655 | 2/1966 | Murch et al. | 99—106 |

OTHER REFERENCES

Braverman, Citrus Products, 1949, pp. 92–94, 275–278, 307–309.

Enzyme Topics, Rohm and Haas Company, May 1964.

MORRIS O. WOLK, Primary Examiner

S. B. DAVIS, Assistant Examiner

U.S. Cl. X.R.

99—78, 106, 205; 424—153